United States Patent
Kodama et al.

(10) Patent No.: US 10,121,378 B2
(45) Date of Patent: Nov. 6, 2018

(54) COLLISION AVOIDANCE SYSTEM

(71) Applicant: The Yokohama Rubber Co., LTD., Minato-ku, Tokyo (JP)

(72) Inventors: Yuji Kodama, Hiratsuka (JP); Koji Nakatani, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/539,655

(22) PCT Filed: Dec. 26, 2014

(86) PCT No.: PCT/JP2014/084562
§ 371 (c)(1),
(2) Date: Jun. 23, 2017

(87) PCT Pub. No.: WO2016/103459
PCT Pub. Date: Jun. 30, 2016

(65) Prior Publication Data
US 2017/0372611 A1    Dec. 28, 2017

(51) Int. Cl.
*G08G 1/01* (2006.01)
*G08G 1/16* (2006.01)
(Continued)

(52) U.S. Cl.
CPC ............ *G08G 1/166* (2013.01); *B60C 19/00* (2013.01); *B60C 23/04* (2013.01); *B60C 23/06* (2013.01);
(Continued)

(58) Field of Classification Search
CPC . G08G 1/166; G08G 1/09; G08G 1/01; B06T 7/12; B06C 19/00; B06C 23/06; B06C 23/04; B60Q 9/008
See application file for complete search history.

(56) References Cited

U.S. PATENT DOCUMENTS 5,442,553 A * 8/1995 Parrillo ............... G06F 8/65
                                                     455/420
8,165,748 B2 * 4/2012 Goto .................. G01C 21/3626
                                                     340/905
(Continued)

FOREIGN PATENT DOCUMENTS

JP    2004-224227    8/2004
JP    2006-023862    1/2006
(Continued)

OTHER PUBLICATIONS

International Search Report for International Application No. PCT/JP2014/084562 dated Mar. 24, 2015, 4 pages, Japan.

*Primary Examiner* — Hai Phan
*Assistant Examiner* — Son M Tang
(74) *Attorney, Agent, or Firm* — Thorpe North & Western

(57) ABSTRACT

A collision avoidance system includes: an onboard acquisition unit provided in a vehicle traveling on a road that acquires state quantity data indicating a state quantity of a pneumatic tire of the vehicle; an onboard transmission unit provided in the vehicle that transmits the state quantity data acquired by the onboard acquisition unit to a data acquisition roadside device installed on the road; an abnormality determination unit that determines whether or not the state quantity data is abnormal; and a management device including a data acquisition unit that acquires the state quantity data from the data acquisition roadside device, a data storage unit that stores the state quantity data acquired by the data acquisition unit, and a data distribution unit that distributes the state quantity data determined as abnormal by the abnormality determination unit.

15 Claims, 21 Drawing Sheets

(51) Int. Cl.
*B60C 23/04* (2006.01)
*B60C 23/06* (2006.01)
*B60C 19/00* (2006.01)
*B60Q 9/00* (2006.01)
*G08G 1/09* (2006.01)
*B60T 7/12* (2006.01)

(52) U.S. Cl.
CPC ............... *B60Q 9/008* (2013.01); *B60T 7/12* (2013.01); *G08G 1/01* (2013.01); *G08G 1/09* (2013.01)

(56) References Cited

U.S. PATENT DOCUMENTS

| | | | | |
|---|---|---|---|---|
| 8,432,295 | B2* | 4/2013 | Ueno | G08G 1/0967 |
| | | | | 340/905 |
| 8,483,903 | B2* | 7/2013 | Tengler | B60R 16/00 |
| | | | | 340/435 |
| 8,754,788 | B2* | 6/2014 | Yamamoto | H04W 4/04 |
| | | | | 340/905 |
| 8,880,237 | B2* | 11/2014 | Boss | G06F 19/00 |
| | | | | 701/1 |
| 9,046,457 | B2* | 6/2015 | Hanatsuka | B60G 17/0165 |
| 9,349,287 | B1* | 5/2016 | Holzwanger | G08G 1/0133 |
| 2008/0306678 | A1* | 12/2008 | Miyawaki | G08G 1/127 |
| | | | | 701/118 |
| 2009/0105921 | A1* | 4/2009 | Hanatsuka | B60G 17/0165 |
| | | | | 701/80 |
| 2009/0105925 | A1* | 4/2009 | Harada | G08G 1/0104 |
| | | | | 701/99 |
| 2009/0295558 | A1 | 12/2009 | Kameyama | |
| 2010/0060443 | A1* | 3/2010 | Wakao | B60C 11/246 |
| | | | | 340/444 |
| 2010/0198455 | A1 | 8/2010 | Hotta et al. | |
| 2010/0321206 | A1* | 12/2010 | Kuga | G01C 21/3679 |
| | | | | 340/905 |
| 2011/0282566 | A1* | 11/2011 | Kawauchi | G08G 1/161 |
| | | | | 701/117 |
| 2014/0288811 | A1* | 9/2014 | Oura | G08G 1/0116 |
| | | | | 701/119 |
| 2014/0302774 | A1 | 10/2014 | Burke et al. | |
| 2015/0040656 | A1* | 2/2015 | Singh | B60C 11/246 |
| | | | | 73/146.5 |
| 2016/0129734 | A1* | 5/2016 | Sinner | B60C 23/001 |
| | | | | 701/2 |
| 2016/0364699 | A1* | 12/2016 | Steketee | G06Q 10/20 |
| 2017/0308749 | A1* | 10/2017 | Tanno | G06K 9/00637 |

FOREIGN PATENT DOCUMENTS

| | | |
|---|---|---|
| JP | 2006-232031 | 9/2006 |
| JP | 2008-065753 | 3/2008 |
| JP | 2009-090718 | 4/2009 |
| JP | 2009-294791 | 12/2009 |
| JP | 2011-180934 | 9/2011 |
| JP | 2013-109746 | 6/2013 |
| WO | WO 2009/041457 | 4/2009 |

* cited by examiner

| | FIRST DATA COLLECTION POINT | SECOND DATA COLLECTION POINT | THIRD DATA COLLECTION POINT | | NTH DATA COLLECTION POINT |
|---|---|---|---|---|---|
| △△:□□:×× | NORMAL TIRE PASSED | | NORMAL TIRE PASSED | | ABNORMAL TIRE PASSED (VEHICLE CODE 3456) |
| □□:×x:O× | | ABNORMAL TIRE PASSED (VEHICLE CODE 5678) | NORMAL TIRE PASSED | | |
| □□:××:△△ | ABNORMAL TIRE PASSED (VEHICLE CODE 1234) | | NORMAL TIRE PASSED | | NORMAL TIRE PASSED |
| ... | | | | | |
| △△:××:OO | NORMAL TIRE PASSED | | NORMAL TIRE PASSED | | NORMAL TIRE PASSED |
| OO:OO:×× | NORMAL TIRE PASSED | NORMAL TIRE PASSED | | | NORMAL TIRE PASSED |
| ××:××:×× | NORMAL TIRE PASSED | | ABNORMAL TIRE PASSED (VEHICLE CODE 9012) | | |
| OO:OO:×× | NORMAL TIRE PASSED | | | | |
| ... | ... | ... | ... | | ... |
| ... | | | | | |

FIG. 11

COLLISION AVOIDANCE SYSTEM

TECHNICAL FIELD

The present technology relates to a collision avoidance system.

BACKGROUND ART

In the technical field related to collision avoidance systems whereby vehicles avoid collisions, technology is known in which roadside devices installed by the side of a road and road surface condition sensors provided on the road are used (e.g. see Japanese Unexamined Patent Application Publication No. 2009-090718A).

SUMMARY

Driving performance of tires declines when the air pressure of pneumatic tires mounted on a vehicle decreases or wear of the pneumatic tires progresses and, as a result, the possibility of collisions increases. As such, there is a need for a collision avoidance system that takes state quantities of pneumatic tires such as air pressure and amount of wear into consideration.

The present technology provides a collision avoidance system whereby collisions of vehicles are avoided by taking state quantities of pneumatic tires into consideration.

According to the aspect of the present technology, a collision avoidance system is provided that includes an onboard acquisition unit provided in a vehicle traveling on a road and configured to acquire state quantity data indicating a state quantity of a pneumatic tire of the vehicle; an onboard transmission unit provided in the vehicle and configured to transmit the state quantity data acquired by the onboard acquisition unit to a data acquisition roadside device installed on the road; an abnormality determination unit configured to determine whether or not the state quantity data is abnormal; and a management device. In such a collision avoidance system, the management device includes a data acquisition unit configured to acquire the state quantity data from the data acquisition roadside device; a data storage unit configured to store the state quantity data acquired by the data acquisition unit; and a data distribution unit configured to distribute the state quantity data determined as abnormal by the abnormality determination unit.

In the aspect of the present technology, a configuration is possible in which the data distribution unit is configured to distribute the state quantity data to a data transmission roadside device installed on the road; and the state quantity data is transmitted via the data transmission roadside device to at least one of a preceding vehicle traveling in front of the vehicle and a following vehicle traveling behind the vehicle.

In the aspect of the present technology, a configuration is possible in which the management device is configured to collect the state quantity data of the pneumatic tires of each of a plurality of vehicles that has passed a predetermined location of the road; and among the plurality of vehicles, when an abnormal vehicle for which the state quantity data has been determined as abnormal passes the predetermined location again, transmit, to the abnormal vehicle, request data requesting improvement of the pneumatic tire.

In the aspect of the present technology, a configuration is possible in which the management device is configured to transmit analysis data on the state quantity data collected in a predetermined period to the abnormal vehicle.

In the aspect of the present technology, a configuration is possible in which the vehicle travels in accordance with a dispatch order; and the data distribution unit is configured to distribute the state quantity data to a command device configured to issue the dispatch order.

In the aspect of the present technology, a configuration is possible in which the management device is configured to collect the state quantity data of the pneumatic tires of each of a plurality of vehicles to which dispatch orders are issued by the command device; and distribute the analysis data on the state quantity data that has been collected to the command device.

In the aspect of the present technology, a configuration is possible in which the state quantity includes an amount of wear of the pneumatic tire; and the onboard acquisition unit includes a wear operation determination unit configured to determine whether or not a wear operation whereby the pneumatic tire is worn has been performed, and an estimation unit configured to estimate the amount of wear of the pneumatic tire on the basis of history data of the wear operation.

In the aspect of the present technology, a configuration is possible in which the wear operation includes at least one of a rapid deceleration operation where the vehicle decelerates at a first predetermined speed per unit time or faster, and a cornering operation where the vehicle travels on a curve having a curvature radius less than or equal to a predetermined value at a second predetermined speed or faster.

In the aspect of the present technology, a configuration is possible in which the state quantity includes an amount of wear of the pneumatic tire; and the collision avoidance system includes a following vehicle acquisition unit provided in the following vehicle traveling behind the vehicle and configured to acquire an amount of wear data indicating the amount of wear of the pneumatic tire of the vehicle; and a following vehicle transmission unit provided in the following vehicle and configured to transmit the amount of wear data acquired by the following vehicle acquisition unit to the data acquisition roadside device. In such a collision avoidance system, the abnormality determination unit is configured to determine whether or not the amount of wear data is abnormal; and the data distribution unit is configured to distribute the amount of wear data determined as abnormal by the abnormality determination unit to at least one of the vehicle and a second following vehicle traveling behind the following vehicle.

In the aspect of the present technology, a configuration is possible in which the pneumatic tire includes a first mark provided on a surface of a tread portion that comes into contact with a road surface, and a second mark embedded in tread rubber of the tread portion; and the following vehicle acquisition unit includes a camera configured to acquire images of the first mark and the second mark, and is configured to estimate the amount of wear of the pneumatic tire on the basis of image data representing the acquired image.

According to the aspect of the present technology, a collision avoidance system is provided whereby collisions of vehicles are avoided by taking state quantities of pneumatic tires into consideration.

BRIEF DESCRIPTION OF DRAWINGS

FIG. 11 is a drawing schematically illustrating an example of a data storage unit according to the third embodiment.

DETAILED DESCRIPTION

Embodiments according to the present technology will be described with reference to the drawings. However, the present technology is not limited to these embodiments. Constituents of the embodiments described below can be combined with one another as appropriate. In addition, there are also cases where some of the constituents are not used.

First Embodiment

Figure 1:
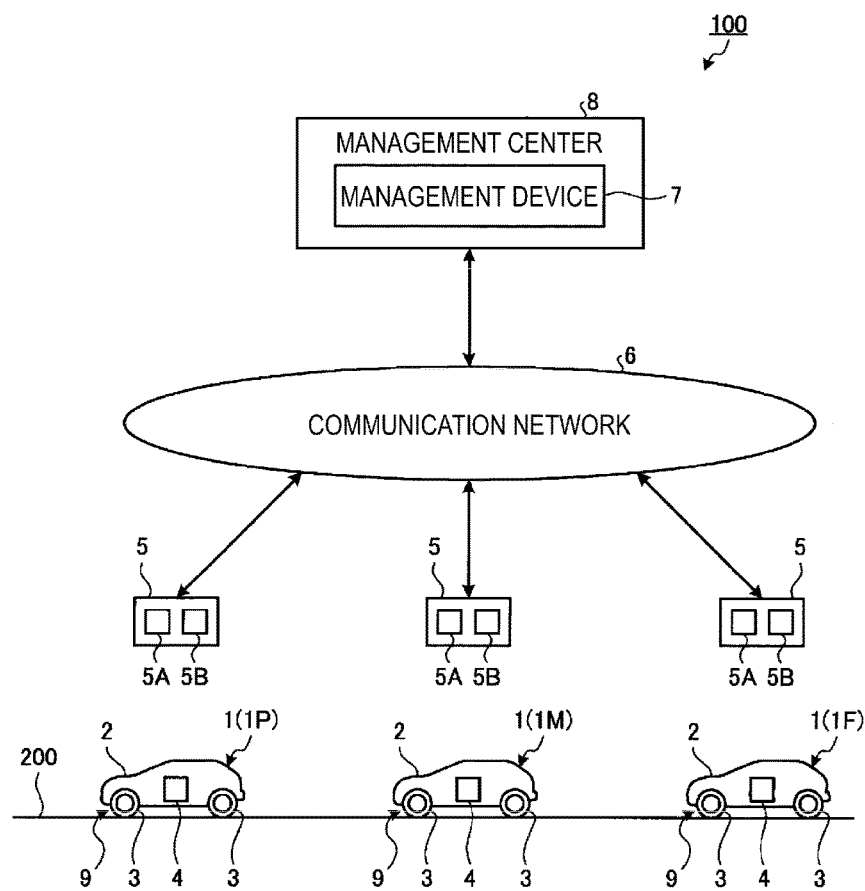
FIG. 1 is a drawing schematically illustrating an example of a collision avoidance system according to a first embodiment.

A first embodiment will now be described. FIG. 1 is a drawing schematically illustrating an example of a collision avoidance system 100 according to the present embodiment. The collision avoidance system 100 avoids collisions between vehicles 1. The collision avoidance system 100 also reduces damage caused by collisions between the vehicles 1. Furthermore, the collision avoidance system 100 prevents collisions between the vehicles 1.

As illustrated in FIG. 1, the vehicles 1 travel on a road 200. A plurality of vehicles 1 travels on the road 200. Of the plurality of vehicles 1, the collision avoidance system 100 avoids collisions between a vehicle 1M and a vehicle 1P traveling in front of the vehicle 1M. Additionally, the collision avoidance system 100 avoids collisions between the vehicle 1M and a vehicle 1F traveling behind the vehicle 1M. In the following description, the vehicle 1M is referred to as a "host vehicle 1M" for convenience, the vehicle 1P traveling in front of the host vehicle 1M is referred to as a "preceding vehicle 1P" for convenience, and the vehicle 1F traveling behind the host vehicle 1M is referred to as a "following vehicle 1F" for convenience. The term "vehicle 1" is used to collectively refer to the host vehicle 1M, the preceding vehicle 1P, and the following vehicle 1F. In the following description, the term "vehicle 1" is used in cases where it is not necessary to distinguish between the host vehicle 1M, the preceding vehicle 1P, and the following vehicle 1F.

The vehicle 1 is provided with a driving apparatus 9 including pneumatic tires 3, a vehicle body 2 supported by the driving apparatus 9, and a control device 4. In the following description, the pneumatic tires 3 are also referred to as "tires 3" for convenience. The control device 4 controls the vehicle 1. The control device 4 includes a computer system such as an Engine Control Unit (ECU).

A roadside device 5 is installed on the road 200. A plurality of the roadside device 5 is installed on the road 200 at predetermined intervals. The plurality of roadside devices 5 is capable of communicating via a communication network 6. Each of the roadside devices 5 includes a wireless communication function. Moreover, each of the roadside devices 5 includes a communication device and a computer system capable of wireless communication with the control device 4 of the vehicle 1. The control device 4 of the vehicle 1 and the roadside devices 5 communicate wirelessly.

The roadside devices 5 include a data acquisition unit 5A that acquires data from the control device 4, and a data transmission unit 5B that transmits data to the control device 4. The roadside devices 5 include both the function of a data acquisition roadside device to which data is wirelessly transmitted from the control device 4, and the function of a data transmission roadside device that wirelessly transmits data to the control device 4. Note that, the data acquisition roadside device and the data transmission roadside device may be individual devices.

The collision avoidance system 100 is provided with a management device 7 that connects to the roadside devices 5 via the communication network 6. The management device 7 is installed in a management center 8. The management device 7 includes a computer system. The management device 7 communicates with the roadside devices 5 via the communication network 6.

Figure 2:
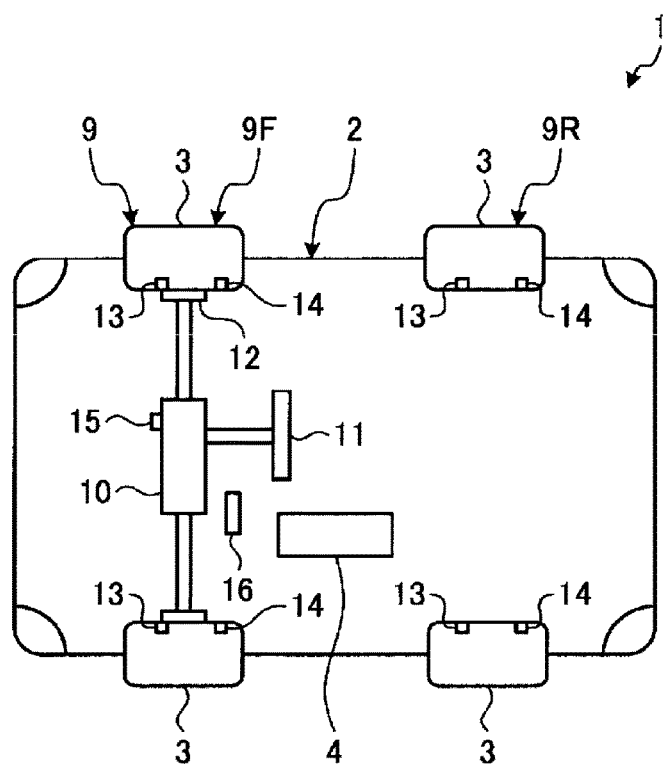
FIG. 2 is a drawing schematically illustrating an example of a vehicle according to the first embodiment.

FIG. 2 is a drawing schematically illustrating an example of the vehicle 1 according to the present embodiment. The vehicle 1 is provided with the driving apparatus 9 including the tires 3, the vehicle body 2 supported by the driving apparatus 9, a steering apparatus 10 capable of changing a direction of travel of the vehicle 1, a steering operation unit 11 that operates the steering apparatus 10, and the control device 4 that controls the vehicle 1.

The vehicle 1 has a driver cab that a driver occupies. The steering operation unit 11 is disposed in the driver cab. The steering operation unit 11 is operated by a driver. The steering operation unit 11 includes a steering wheel.

Additionally, the vehicle 1 includes a warning device 16 disposed in the driver cab. The warning device 16 includes at least one of a display device and an audio output device. The display of a car navigation system may also be used as the warning device 16.

The tires 3 are mounted on the vehicle body 2. In the present embodiment, the vehicle 1 is a four-wheeled vehicle. The driving apparatus 9 includes two front wheels 9F and two rear wheels 9R.

The steering apparatus 10 includes a rack and pinion mechanism, and can change the orientation of the front wheels 9F as a result of the steering operation unit 11 being operated. The direction of travel of the vehicle 1 is changed as a result of the orientation of the front wheels 9F being changed by the steering apparatus 10.

Additionally, the vehicle 1 is provided with a speed sensor 12 that detects the travel speed of the vehicle 1, a pressure sensor 13 that detects the air pressure of the tires 3, a temperature sensor 14 that detects the temperature of the tires 3, and a steering sensor 15 that detects the steering angle of the steering apparatus 10. Travel speed data, detected by the speed sensor 12, that indicates the travel speed of the vehicle 1 is output to the control device 4. Air pressure data, detected by the pressure sensor 13, that indicates the air pressure of the tires 3 is output to the control device 4. Temperature data, detected by the temperature sensor 14, that indicates the temperature of the tires 3 is output to the control device 4. Steering angle data, detected by the steering sensor 15, that indicates the steering angle of the steering apparatus 10 is output to the control device 4. The pressure sensor 13 is provided on each of the four tires 3. The control device 4 acquires the air pressure data of each of the four tires 3. The temperature sensor 14 is provided on each of the four tires 3. The control device 4 acquires the temperature data of each of the four tires 3.

Figure 3:
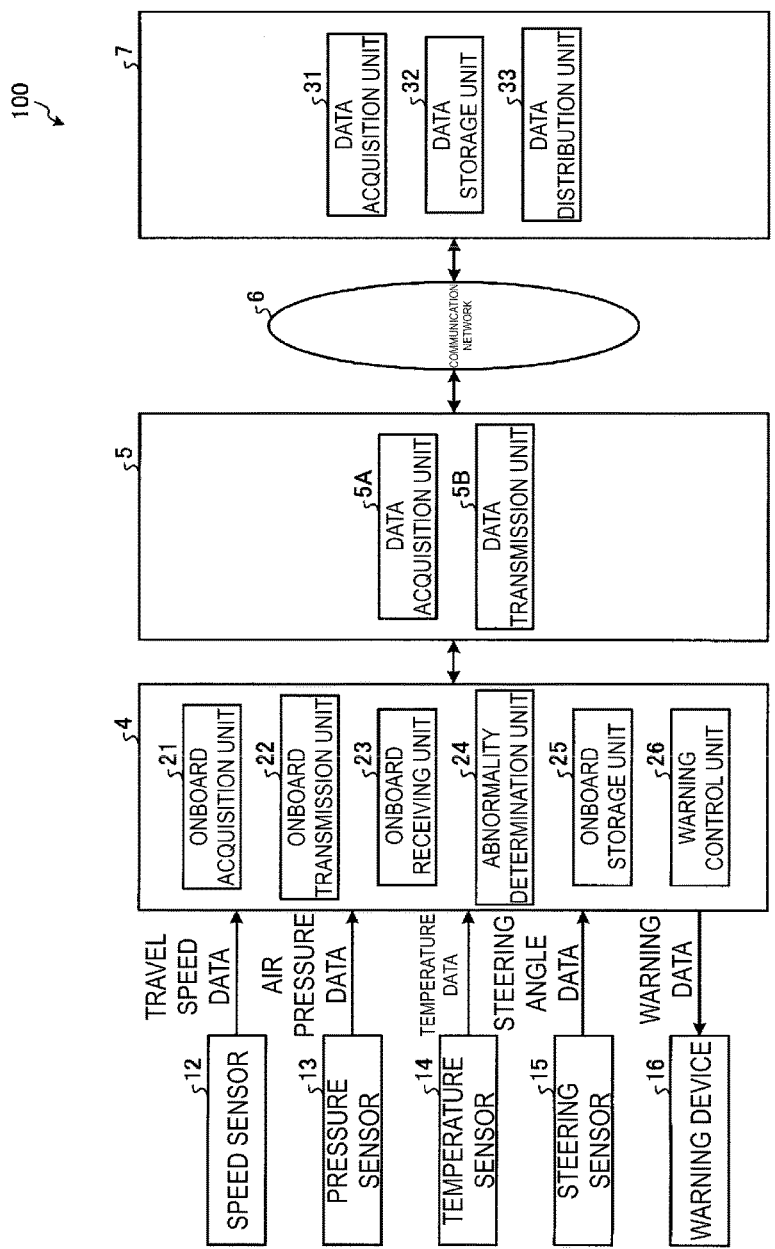
FIG. 3 is a function block diagram illustrating an example of the collision avoidance system according to the first embodiment.

FIG. 3 is a function block diagram illustrating an example of the collision avoidance system 100 according to the present embodiment. As illustrated in FIG. 3, the collision avoidance system 100 includes the control device 4 provided in the vehicle 1, the roadside device 5 provided on the road 200, and the management device 7 provided in the management center 8.

The control device 4 includes an onboard acquisition unit 21 that acquires state quantity data indicating a state quantity of the tires 3 of the vehicle 1, an onboard transmission unit 22 that transmits the state quantity data acquired by the onboard acquisition unit 21 to the data acquisition unit 5A of the roadside device 5 installed on the road 200, an onboard receiving unit 23 that receives the state quantity data transmitted from the data transmission unit 5B of the roadside device 5, an abnormality determination unit 24 that determines whether or not the state quantity data acquired by the onboard acquisition unit 21 is abnormal, an onboard storage unit 25 that stores reference value data that serves as criteria for the abnormality determination, and a warning control unit 26 that controls the warning device 16.

The roadside device 5 includes the data acquisition unit 5A that acquires the state quantity data of the tires 3 transmitted from the onboard transmission unit 22 of the control device 4, and the data transmission unit 5B that transmits the state quantity data of the tires 3 to the onboard receiving unit 23 of the control device 4.

The management device 7 includes a data acquisition unit 31 that acquires the state quantity data of the tires 3 from the data acquisition unit 5A of the roadside device 5, a data storage unit 32 that stores the state quantity data acquired by the data acquisition unit 31, and a data distribution unit 33 that distributes the state quantity data determined as abnormal by the abnormality determination unit 24.

The state quantity of the tires 3 includes at least one of the air pressure of the tires 3, the temperature of the tires 3, and the amount of wear of the tread portion of the tires 3. The state quantity data of the tires 3 includes at least one of air pressure data indicating the air pressure of the tires 3, temperature data indicating the temperature of the tires 3, and amount of wear data indicating the amount of wear of the tread portions of the tires 3.

The onboard acquisition unit 21 acquires travel speed data indicating the travel speed of the vehicle 1 from the speed sensor 12. The onboard acquisition unit 21 acquires the air pressure data indicating the air pressure of the tires 3 from the pressure sensor 13. The onboard acquisition unit 21 acquires the temperature data indicating the temperature of the tires 3 from the temperature sensor 14. The onboard acquisition unit 21 acquires the steering angle data indicating the steering angle of the steering apparatus 10 from the steering sensor 15.

The abnormality determination unit 24 determines whether or not the state quantity data acquired by the onboard acquisition unit 21 is abnormal. In the present embodiment, the reference value data that serves as criteria for the abnormality determination is stored in the onboard storage unit 25. The abnormality determination unit 24 compares the state quantity data acquired by the onboard acquisition unit 21 with the reference value data stored in the onboard storage unit 25 to determine whether or not the state quantity data is abnormal.

The abnormality determination unit 24 compares the air pressure data acquired by the onboard acquisition unit 21 with the reference value data (suitable value data) for the air pressure of the tires 3 stored in the onboard storage unit 25 to determine whether or not the air pressure data is abnormal. For example, in a case where the air pressure data acquired by the onboard acquisition unit 21 is lower than a predetermined suitable range of air pressure, the abnormality determination unit 24 determines that the air pressure of the tires 3 is abnormal. Additionally, in a case where the air pressure data acquired by the onboard acquisition unit 21 is higher than the predetermined suitable range of air pressure, the abnormality determination unit 24 determines that the air pressure of the tires 3 is abnormal.

The abnormality determination unit 24 compares the temperature data acquired by the onboard acquisition unit 21 with the reference value data (suitable value data) for the temperature of the tires 3 stored in the onboard storage unit 25 to determine whether or not the temperature data is abnormal. For example, in a case where the temperature data acquired by the onboard acquisition unit 21 is lower than a predetermined suitable range of temperature, the abnormality determination unit 24 determines that the temperature of the tires 3 is abnormal. Additionally, in a case where the temperature data acquired by the onboard acquisition unit 21 is higher than a predetermined suitable range of temperature, the abnormality determination unit 24 determines that the temperature of the tires 3 is abnormal.

The abnormality determination unit 24 compares the amount of wear data acquired by the onboard acquisition unit 21 with the reference value data (suitable value data) for the amount of wear of the tires 3 stored in the onboard storage unit 25 to determine whether or not the amount of wear data is abnormal. For example, in a case where the amount of wear data acquired by the onboard acquisition unit 21 is greater than a predetermined suitable amount of wear, the abnormality determination unit 24 determines that the amount of wear of the tread portion of the tires 3 is abnormal.

In the following description, state quantity data that has been determined to be abnormal by the abnormality determination unit 24 is referred to as "abnormal data" for convenience. Additionally, in the following description, state quantity data that has been determined as not abnormal by the abnormality determination unit 24 is referred to as "normal data" for convenience.

The onboard transmission unit 22 transmits state quantity data that has been determined as abnormal by the abnormality determination unit 24, namely abnormal data, to the data acquisition unit 5A. The onboard transmission unit 22 wirelessly transmits the abnormal data to the data acquisition unit 5A. The onboard transmission unit 22 may transmit only the abnormal data to the data acquisition unit 5A. The onboard transmission unit 22 may transmit both the abnormal data and the normal data to the data acquisition unit 5A.

The data acquisition unit 5A acquires the state quantity data including at least the abnormal data from the onboard transmission unit 22. The state quantity data acquired by the data acquisition unit 5A is transmitted to the data acquisition unit 31 of the management device 7 via the communication network 6.

The data acquisition unit 31 acquires the state quantity data from the data acquisition unit 5A of the roadside device 5. The state quantity data acquired by the data acquisition unit 31 is stored in the data storage unit 32. The data storage unit 32 may store only the abnormal data. The data storage unit 32 may store both the abnormal data and the normal data.

The data distribution unit 33 distributes at least the abnormal data of the state quantity data acquired by the data acquisition unit 31. In the present embodiment, the data distribution unit 33 transmits the abnormal data to the data transmission unit 5B of the roadside device 5 via the communication network 6.

The data transmission unit 5B acquires the abnormal data from the data distribution unit 33. The data distribution unit 33 wirelessly transmits the abnormal data to the onboard receiving unit 23 of the vehicle 1. Thus, the abnormal data is distributed to the vehicle 1.

Figure 4:
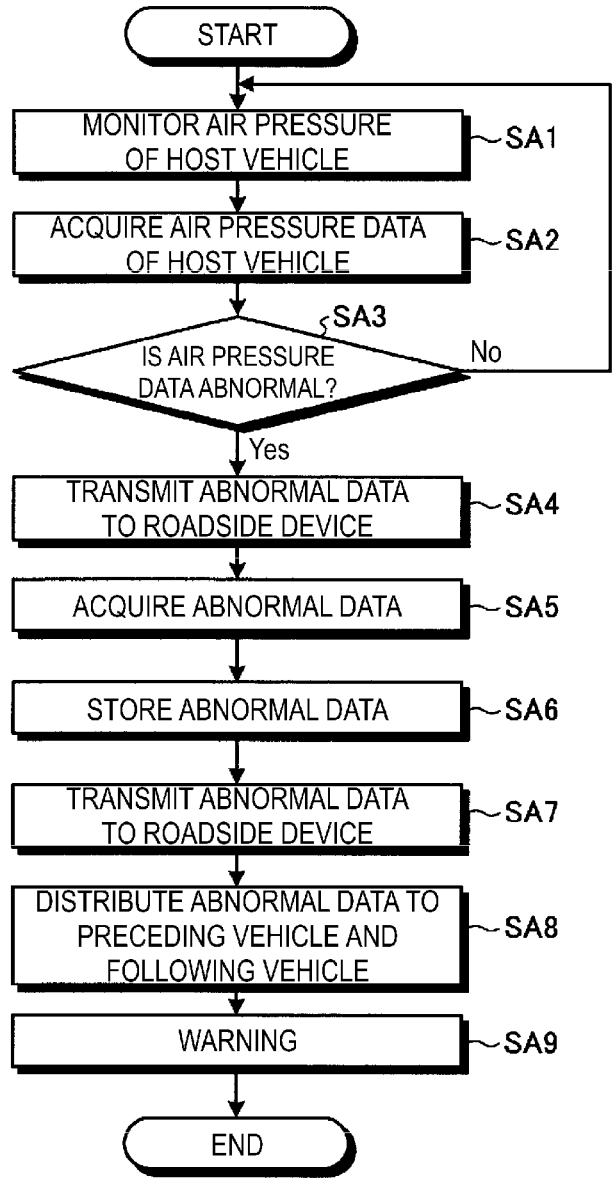
FIG. 4 is a flowchart illustrating an example of a collision avoidance method according to the first embodiment.
Figure 5:
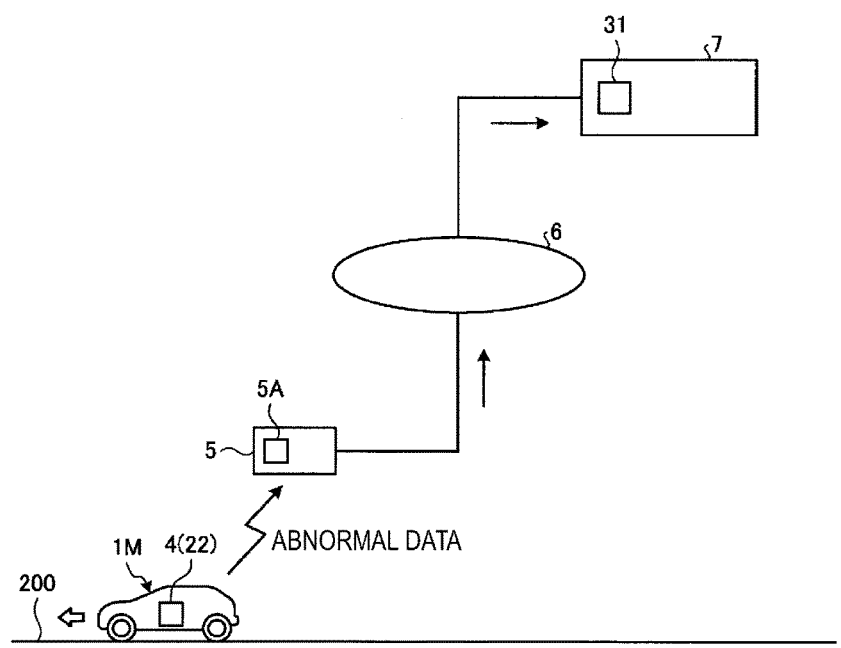
FIG. 5 is a schematic drawing illustrating an example of the collision avoidance method according to the first embodiment.
Figure 6:
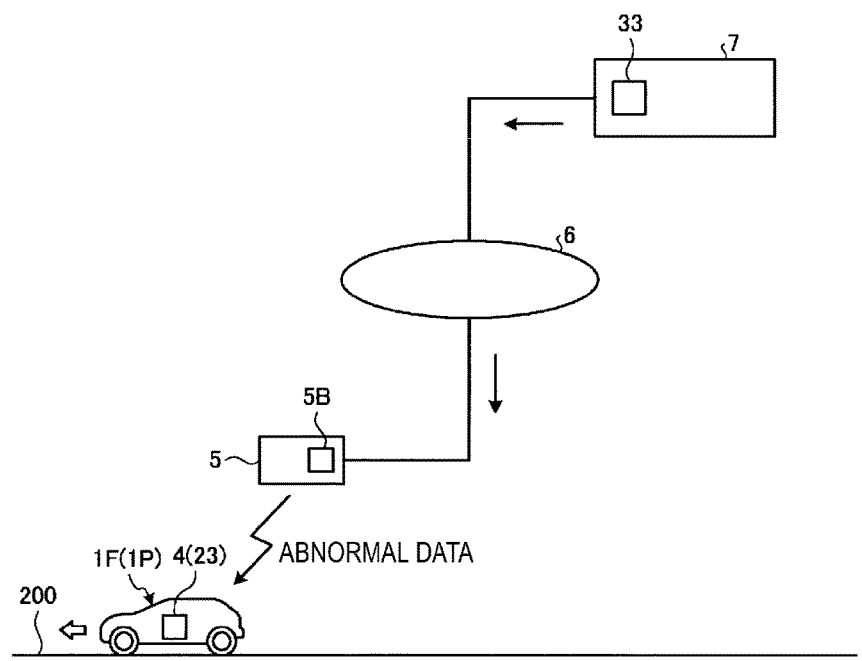
FIG. 6 is a schematic drawing illustrating an example of the collision avoidance method according to the first embodiment.

Next, an example of a collision avoidance method according to the present embodiment will be described with reference to FIGS. 4 to 7. FIG. 4 is a flowchart illustrating an example of the collision avoidance method according to the present embodiment. FIGS. 5 and 6 are schematic drawings illustrating an example of the collision avoidance method according to the first embodiment.

In the following description, the air pressure data of the tires 3 is used as the state quantity data of the tires 3. Additionally, the air pressure data of the tires 3 that is acquired is the air pressure data of the tires 3 mounted on the host vehicle 1M described while referencing FIG. 1 above.

The host vehicle 1M travels on the road 200. While the host vehicle 1M is traveling, the air pressure of the tires 3 of the host vehicle 1M is monitored by the pressure sensor 13 (step SA1). The air pressure data, detected by the pressure sensor 13, that indicates the air pressure of the tires 3 of the host vehicle 1M is output to the onboard acquisition unit 21 of the control device 4 of the host vehicle 1M. The onboard acquisition unit 21 of the host vehicle 1M acquires the air pressure data indicating the air pressure of the tires 3 of the host vehicle 1M (step SA2).

The abnormality determination unit 24 of the host vehicle 1M determines whether or not the air pressure data acquired by the onboard acquisition unit 21 is abnormal (step SA3). The abnormality determination unit 24 determines whether or not the air pressure data is abnormal on the basis of the reference value data stored in the onboard storage unit 25.

In cases where the air pressure data is determined as not abnormal in step SA3 (step SA3: No), monitoring of the air pressure is continued.

In cases where the air pressure data is determined as abnormal in step SA3 (step SA3: Yes), as illustrated in FIG. 5, the onboard transmission unit 22 of the host vehicle 1M transmits the air pressure data determined as abnormal, namely the abnormal data, to the data acquisition unit 5A of the roadside device 5 (step SA4).

The abnormal data of the host vehicle 1M transmitted to the roadside device 5 is transmitted to the management device 7 of the management center 8 via the communication network 6. The data acquisition unit 31 of the management device 7 acquires the abnormal data of the host vehicle 1M (step SA5).

The abnormal data of the host vehicle 1M acquired by the data acquisition unit 31 is stored in the data storage unit 32 (step SA6). Note that, not only the abnormal data, but also the normal data may be transmitted from the host vehicle 1M to the management device 7. The data storage unit 32 may store both the normal data and the abnormal data.

As illustrated in FIG. 6, the data distribution unit 33 of the management device 7 distributes the abnormal data of the host vehicle 1M to at least one of the preceding vehicle 1P and the following vehicle 1F. The data distribution unit 33 transmits the abnormal data of the host vehicle 1M to the data transmission unit 5B of the roadside device 5 (step SA7).

The data transmission unit 5B of the roadside device 5 transmits the abnormal data of the host vehicle 1M to the preceding vehicle 1P and/or the following vehicle 1F. As a result, the abnormal data of the host vehicle 1M that is traveling on the road 200 is transmitted via the roadside device 5 to at least one of the preceding vehicle 1P traveling in front of the host vehicle 1M and the following vehicle 1F traveling behind the host vehicle 1M (step SA8).

Each of the preceding vehicle 1P and the following vehicle 1F is provided with the control device 4 described while referencing FIG. 3 above. The following vehicle 1F receives, with the onboard receiving unit 23 thereof, the abnormal data of the host vehicle 1M transmitted from the data transmission unit 5B of the roadside device 5. Upon receipt of the abnormal data of the host vehicle 1M, the warning control unit 26 of the following vehicle 1F controls the warning device 16 of the following vehicle 1F so as to notify the driver of the following vehicle 1F that the air pressure of the tires 3 of the host vehicle 1M is abnormal. The warning control unit 26 of the following vehicle 1F outputs warning data to the warning device 16 of the following vehicle 1F (step SA9).

Figure 7:
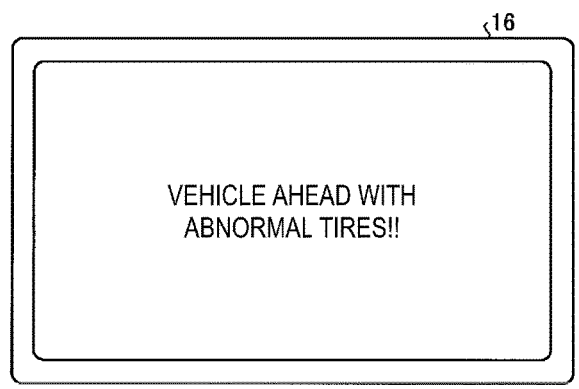
FIG. 7 is a schematic drawing illustrating an example of the collision avoidance method according to the first embodiment.

For example, as illustrated in FIG. 7, the warning device 16 of the following vehicle 1F outputs display data indicating that the air pressure of the tires 3 of the host vehicle 1M is abnormal on the basis of the warning data. Note that the warning device 16 of the following vehicle 1F may output audio data indicating that the air pressure of the tires 3 of the host vehicle 1M is abnormal on the basis of the warning data. As a result, the driver of the following vehicle 1F can be notified that the air pressure of the tires 3 of the host vehicle 1M is abnormal.

The same applies to the preceding vehicle 1P. The preceding vehicle 1P receives, with the onboard receiving unit 23 thereof, the abnormal data of the host vehicle 1M transmitted from the data transmission unit 5B of the roadside device 5. Upon receipt of the abnormal data of the host vehicle 1M, the warning control unit 26 of the preceding vehicle 1P controls the warning device 16 of the preceding vehicle 1P so as to notify the driver of the preceding vehicle 1P that the air pressure of the tires 3 of the host vehicle 1M is abnormal. The warning control unit 26 of the preceding vehicle 1P outputs warning data to the warning device 16 of the preceding vehicle 1P. The warning device 16 of the preceding vehicle 1P outputs display data indicating that the air pressure of the tires 3 of the host vehicle 1M is abnormal on the basis of the warning data. Note that the warning device 16 of the preceding vehicle 1P may output audio data indicating that the air pressure of the tires 3 of the host vehicle 1M is abnormal on the basis of the warning data. As a result, the driver of the preceding vehicle 1P can be notified that the air pressure of the tires 3 of the host vehicle 1M is abnormal.

Driving performance of the tires 3 may decline when the state quantity of the tires 3 is abnormal. For example, in a case where the air pressure of the tires 3 of the host vehicle 1M is low, the braking performance of the tires 3 may decline. For example, the braking distance of the host vehicle 1M may increase. Additionally, in a case where the air pressure of the tires 3 of the host vehicle 1M is low, the turning performance of the tires 3 may decline. Driving performance of the tires 3 may also decline when the air pressure of the tires 3 is excessively high.

The attention of the driver of the following vehicle 1F is evoked as a result of the abnormal data, indicating the abnormalities of the tires 3 of the host vehicle 1M, being distributed to the following vehicle 1F traveling behind the host vehicle 1M. In order to prevent the following vehicle 1F from rear-ending the host vehicle 1M, the driver of the following vehicle 1F can take measures to avoid collision with the host vehicle 1M such as increasing the inter-vehicle distance with the host vehicle 1M.

Additionally, the attention of the driver of the preceding vehicle 1P is evoked as a result of the abnormal data, indicating the abnormalities of the tires 3 of the host vehicle 1M, being distributed to the preceding vehicle 1P traveling in front of the host vehicle 1M. In order to prevent the preceding vehicle 1P from being rear-ended by the host vehicle 1M, the driver of the preceding vehicle 1P can take measures to avoid collision with the host vehicle 1M such as changing lanes so as to be traveling in a different lane than the host vehicle 1M or pulling over to the roadside to allow the host vehicle 1M to pass.

Note that in the description given while referencing FIG. 4 above, the air pressure data of the host vehicle 1M is distributed as the state quantity data of the host vehicle 1M. The above holds true for cases where the state quantity data of the host vehicle 1M is the temperature data or the amount of wear data of the tires 3 of the host vehicle 1M. Driving performance of the tires 3, including braking performance and turning performance, also declines when the temperature of the tires 3 of the host vehicle 1M is abnormal. Driving performance of the tires 3, including braking performance and turning performance, also declines when the amount of wear of the tires 3 of the host vehicle 1M is great. Even in cases where the state quantity data is the temperature data or the amount of wear data, measures can be taken to avoid collision with the host vehicle 1M by carrying out the processing described while referencing FIG. 4 above.

As described above, according to the present embodiment, the driver of the preceding vehicle 1P or the following vehicle 1F can take measures to avoid collision with the host vehicle 1M as a result of the abnormal data of the tires 3 in which abnormalities have occurred being distributed using infrastructure equipment, including the roadside device 5.

Note that, after the abnormal data indicating the abnormalities of the tires 3 of the host vehicle 1M is transmitted to the management device 7 via the roadside device 5 and the communication network 6, the abnormal data of the host vehicle 1M may be distributed to the control device 4 of the host vehicle 1M via the communication network 6 and the roadside device 5. The control device 4 of the host vehicle 1M may use the warning device 16 of the host vehicle 1M to notify the driver of the host vehicle 1M that the tires 3 of the host vehicle 1M are abnormal. As a result, the driver of the host vehicle 1M can take measures to avoid collision with the other vehicles 1 such as reducing the travel speed of the host vehicle 1M, refraining from rapid acceleration or rapid deceleration, and servicing or replacing the tires 3.

Note that the management device 7 may distribute data indicating that the tires 3 of the host vehicle 1M are abnormal to other vehicles in addition to the host vehicle 1M, the preceding vehicle 1P, and the following vehicle 1F. The management device 7 may, for example, distribute data indicating that the tires 3 of the host vehicle 1M are abnormal to a second following vehicle traveling behind the following vehicle 1F, or a second preceding vehicle traveling in front of the preceding vehicle 1P. Many vehicles 1 can be notified that the tires 3 of the host vehicle 1M are abnormal by using infrastructure equipment.

Note that, in the present embodiment, the abnormality determination unit 24 is provided in the vehicle 1. Alternatively, the abnormality determination unit 24 may be provided in the management device 7. For example, all of the air pressure data acquired by the pressure sensor 13 of the vehicle 1, regardless of being abnormal data or normal data, may be transmitted to the management device 7 via the roadside device 5 and the communication network 6. Due to the fact that the reference value data that serves as the criteria for the abnormality determination is stored in the data storage unit 32, the abnormality determination unit 24 of the management device 7 can determine whether or not the acquired air pressure data is abnormal.

Second Embodiment

A second embodiment will now be described. In the following descriptions, constituents identical or equivalent to those in the above-described embodiment have the same reference signs, and descriptions thereof will be simplified or omitted.

Figure 8:
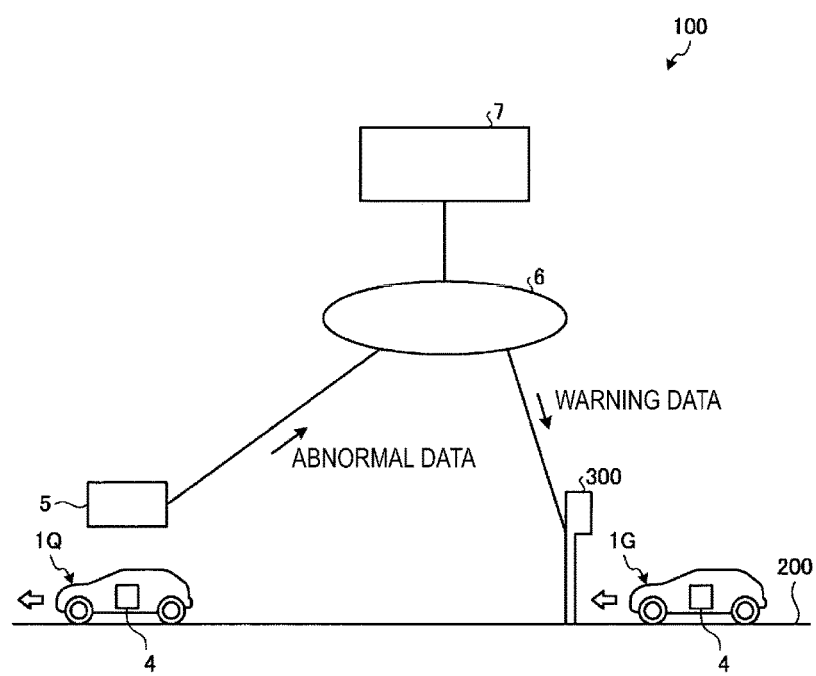
FIG. 8 is a schematic drawing illustrating an example of a collision avoidance method according to a second embodiment.
Figure 9:
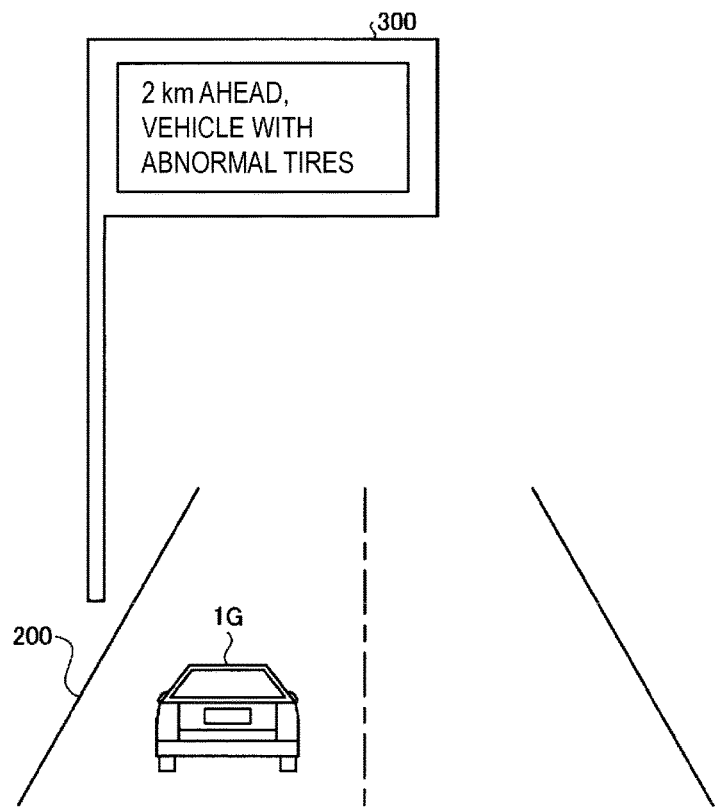
FIG. 9 is a schematic drawing illustrating an example of the collision avoidance method according to the second embodiment.

FIGS. 8 and 9 are schematic drawings for explaining an example of a collision avoidance method according to the present embodiment. As with the embodiment described above, abnormal data of a vehicle 1Q traveling on the road 200 is transmitted to the management device 7 via the roadside device 5 and the communication network 6.

As illustrated in FIG. 8, in the present embodiment, the management device 7 distributes data indicating that the tires 3 of the vehicle 1Q are abnormal to a bulletin board 300 provided on the road 200.

In the present embodiment, communication between the roadside device 5, the management device 7, and the bulletin board 300 is possible via the communication network 6. The abnormal data of the vehicle 1Q is transmitted to the management device 7 via the roadside device 5 and the communication network 6. The management device 7 outputs warning data indicating that the tires 3 of the vehicle 1Q are abnormal to the bulletin board 300.

As illustrated in FIG. 9, the bulletin board 300 outputs display data indicating that the tires 3 of the vehicle 1Q are abnormal on the basis of the warning data. The attention of the driver of a vehicle 1G traveling behind the vehicle 1Q is evoked by the bulletin board 300 provided behind the vehicle 1Q displaying that the tires 3 of the vehicle 1Q are abnormal. The driver of the vehicle 1G who views the bulletin board 300 can become aware of the presence of the vehicle 1Q ahead on which abnormal tires 3 are mounted. As such, the driver of the vehicle 1G can take measures to avoid collision with the vehicle 1Q such as driving carefully.

Third Embodiment

A third embodiment will now be described. In the following description, constituents identical or equivalent to those in the above-described embodiments have the same reference signs, and descriptions thereof will be simplified or omitted.

Figure 10:
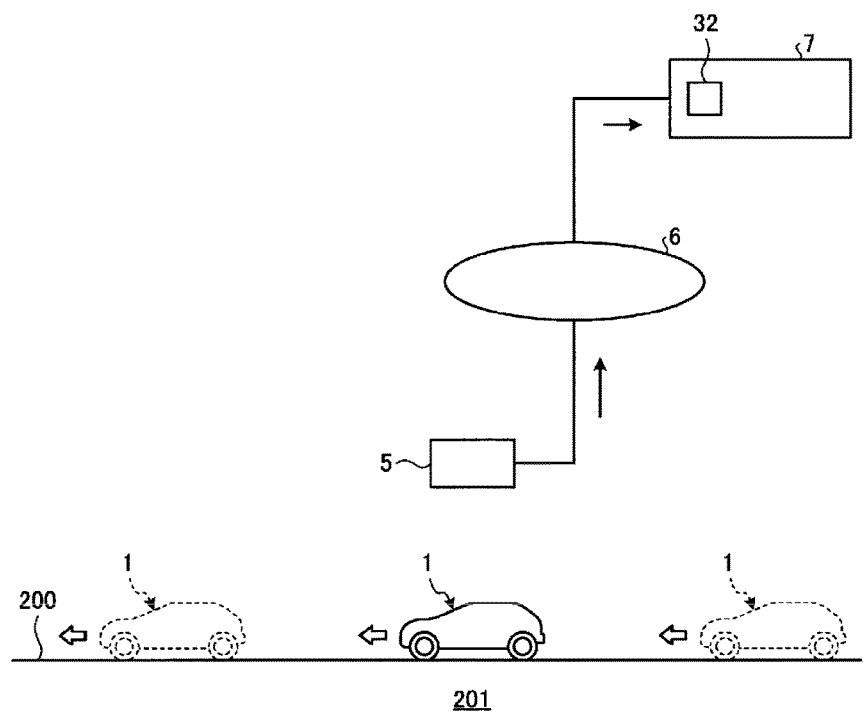
FIG. 10 is a drawing schematically illustrating an example of a collision avoidance system according to a third embodiment.

FIG. 10 is a drawing schematically illustrating an example of a collision avoidance system 100 according to the present embodiment. The management device 7 acquires the state quantity data of the tires 3 of the vehicle 1 transmitted from the roadside device 5 installed at a predetermined location 201 on the road 200. A plurality of vehicles 1 passes by the predetermined location 201. Each of the plurality of vehicles 1 passing by the predetermined location 201 transmits the state quantity data of the tires 3 to the roadside device 5 installed at the predetermined location 201. The roadside device 5 installed at the predetermined location 201 transmits the state quantity data of the tires 3 of the vehicles 1 passing by the predetermined location 201 to the management device 7.

In the present embodiment, the vehicles 1 that pass by the predetermined location 201 transmit identification data (vehicle codes) of the vehicles 1 along with the state quantity data of the tires 3. The management device 7 associates the state quantity data of the tires 3 with the identification data of the vehicle 1 on which the tires 3 are mounted, and acquires this associated data.

The management device 7 associates the state quantity data of the tires 3 of each of the plurality of vehicles 1 passing by the predetermined location 201 on the road 200 with the identification data of the vehicles 1, and collects this associated data. The state quantity data of the tires 3 of each of the plurality of vehicles 1 is stored in the data storage unit 32. The data storage unit 32 associates the state quantity data of the tires 3 with the identification data of the vehicle 1 on which the tires 3 are mounted, and stores this associated data.

In the following description, the predetermined location 201 where the state quantity data of the tires 3 is collected is referred to as "data collection point 201" for convenience.

A plurality of data collection points 201 is established on roads 200 throughout the country. The state quantity data of the tires 3 is transmitted to the management device 7 from the plurality of data collection points 201. The data storage unit 32 stores the state quantity data of the tires 3 collected from the plurality of data collection points 201.

FIG. 11 is a drawing schematically illustrating an example of the data storage unit 32 according to the present embodiment. The data storage unit 32 associates the state quantity data of the tires 3 supplied from the data collection points 201 and acquired by the data acquisition unit 31 with the identification data of the vehicle 1 on which the tires 3 are mounted, the data collection point 201, and the time when the data acquisition was performed by the data acquisition unit 31, and stores this associated data. As described above, a plurality of data collection points 201 is established on roads 200 throughout the country. The data storage unit 32 associates the state quantity data of the tires 3 with the plurality of data collection points 201, the time when the state quantity data was acquired, and the identification data of the vehicle 1, and stores this associated data.

In the present embodiment, among the plurality of vehicles 1 that have passed by the data collection point 201, when an abnormal vehicle 1 for which the state quantity data of the tires 3 has been determined as abnormal passes the data collection point 201 again, the management device 7 transmits request data to the abnormal vehicle 1 requesting improvement of the tires 3.

For example, in a case where an abnormal vehicle 1 on which abnormal tires 3 are mounted passes by a first data collection point 201 of the plurality of data collection points 201 throughout the country at "□□:xx:ΔΔ on ○○" the abnormal data indicating that the tires 3 are abnormal is associated with the location where the state quantity data was acquired (the first data collection point 201), the time when the state quantity data was acquired (□□:xx:ΔΔ on ○○), and the identification data of the abnormal vehicle 1 (vehicle code 1234), and this associated data is transmitted from the roadside device 5 installed at the first data collection point 201 to the management device 7. The management device 7 stores the data related to this abnormal vehicle 1 in the data storage unit 32.

Then, when the abnormal vehicle 1 passes by the first data collection point 201 again, the management device 7 transmits request data to the abnormal vehicle 1 requesting improvement of the tires 3. When the abnormal vehicle 1 passes by the first data collection point 201 again, the management device 7 transmits the request data to the abnormal vehicle via the roadside device 5 installed at the first data collection point 201.

The request data generated on the basis of the abnormal data acquired using the roadside device 5 of the first data collection point 201 is transmitted to the abnormal vehicle 1 via the roadside device 5 of the first data collection point 201. As such, increases in the processing load of the management device 7 are suppressed.

Figure 12:
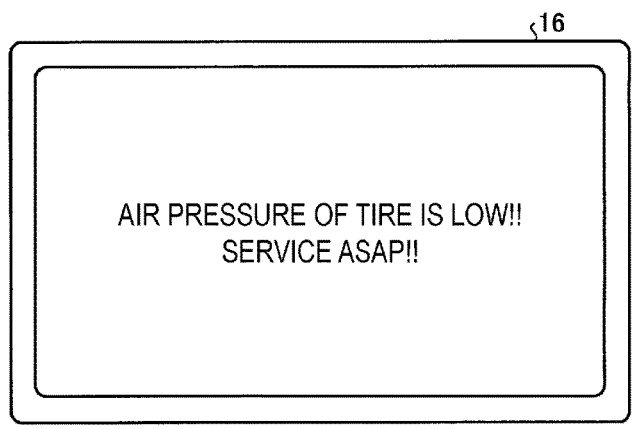
FIG. 12 is a drawing schematically illustrating an example of a warning device according to the third embodiment.

FIG. 12 is a drawing schematically illustrating an example of the request data transmitted to the abnormal vehicle 1. The warning control unit 26 of the control device 4 of the abnormal vehicle 1 generates the warning data on the basis of the request data transmitted from the management device 7. As illustrated in FIG. 12, the warning device 16 of the abnormal vehicle 1 outputs display data requesting improvement of the tires 3 on the basis of the warning data.

If the tires 3 are allowed to remain in the abnormal state, the possibility of the abnormal vehicle 1 colliding with other vehicles 1 increases. The driver of the abnormal vehicle 1 can take measures to resolve the abnormalities of the tires 3 due to the request data being transmitted from the management device 7.

Additionally, in the present embodiment, the management device 7 counts the number of abnormal vehicles 1, for which the state quantity data is determined as abnormal, among the plurality of vehicles 1 that pass by the predetermined location 201 of the road 200 in a certain period. The certain period may be one minute, or may be one hour.

The data distribution unit 33 distributes numerical data indicating the number of abnormal vehicles 1 to other vehicles 1 traveling on the road 200 before the predetermined location 201. The distribution to the other vehicles 1 may be in the form of, for example, displaying the numerical data on the warning devices 16 of the vehicles 1 or displaying the numerical data on the bulletin board 300 described while referencing FIG. 9 above.

As a result, drivers of vehicles 1, for which the numerical data has been acquired, can know approximately how many abnormal vehicles 1 there are in front of them. In cases where there are many abnormal vehicles 1, the possibility of a collision or accident occurring increases. As a result of the numerical data of the abnormal vehicles 1 being distributed, drivers of following vehicles 1 can take measures to avoid collisions such as driving carefully, decreasing travel speeds, or rerouting to different roads 200.

Additionally, in the present embodiment, the management device 7 transmits analysis data on the state quantity data collected in a predetermined period to the abnormal vehicles 1. For example, the management device 7 analyzes a plurality of state quantity data acquired from the plurality of data collection points 201 throughout the country during a period from "ΔΔ o'clock on ∘∘" to "☐☐ o'clock on XX". For example, the management device 7 calculates a proportion of abnormal data in the acquired plurality of state quantity data. The management device 7 transmits the analysis data indicating the proportion of the abnormal data to the abnormal vehicles 1.

Figure 13:
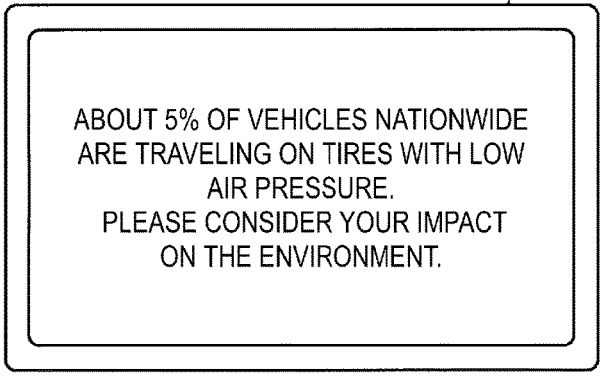
FIG. 13 is a drawing schematically illustrating an example of the warning device according to the third embodiment.

FIG. 13 is a drawing schematically illustrating an example of the analysis data transmitted to the abnormal vehicles 1. The warning control unit 26 of the control device 4 of the abnormal vehicle 1 generates warning data on the basis of the analysis data transmitted from the management device 7. As illustrated in FIG. 13, the warning device 16 of the abnormal vehicle 1 outputs display data representing the analysis data on the state quantity data collected during the predetermined period on the basis of the warning data.

Rolling resistance increases and leads to energy loss when traveling using tires 3 with low air pressure. As a result, the fuel economy of the vehicle 1 worsens and $CO_2$ emissions increase. When there are many vehicles 1 traveling using tires 3 with low air pressure, a large amount of $CO_2$ will be emitted, which may lead to global warming or other environmental issues. Due to the fact that the state quantity data of the tires 3 of many vehicles 1 is acquired and analyzed using infrastructure equipment, messages promoting concern for the environment can be distributed.

Fourth Embodiment

A fourth embodiment will now be described. In the following description, constituents identical or equivalent to those in the above-described embodiments have the same reference signs, and descriptions thereof will be simplified or omitted.

Figure 14:
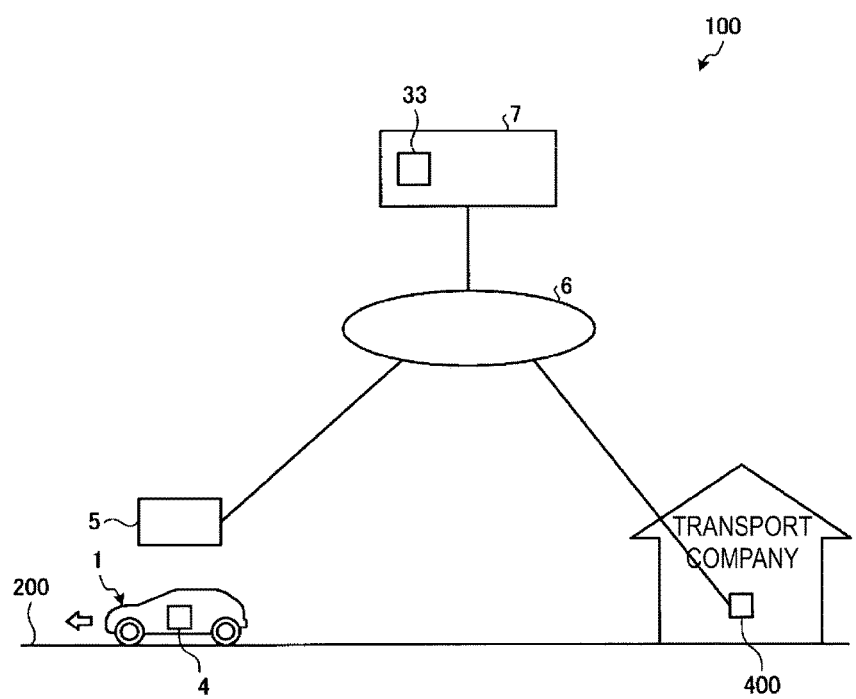
FIG. 14 is a drawing schematically illustrating an example of a collision avoidance system according to a fourth embodiment.

FIG. 14 is a drawing schematically illustrating an example of a collision avoidance system 100 according to the present embodiment. As with the embodiment described above, abnormal data indicating that the tires 3 of a vehicle 1 traveling on the road 200 are abnormal is transmitted to the management device 7 via the roadside device 5 and the communication network 6.

In the present embodiment, the vehicle 1 is a vehicle traveling in accordance with a dispatch order output from a command device 400. The vehicle 1 is a vehicle belonging to a transport company such as a freight shipping company, a bus company, or a taxi company, for example. The transport company has the command device 400 that issues dispatch orders. The command device 400 manages the dispatching of a plurality of vehicles 1. In the present embodiment, the data distribution unit 33 of the management device 7 distributes the abnormal data of the vehicles 1 to the command device 400 that issues dispatch orders. The identification data of the plurality of vehicles 1, to which dispatch orders are issued by the command device 400, is recorded in the data storage unit 32 of the management device 7. That is, the identification data of the vehicles 1 belonging to the transport company is recorded in advance in the management device 7. The data distribution unit 33 determines whether or not abnormal data transmitted to the management device 7 via the roadside device 5 and the communication network 6 has been output from the vehicles 1 belonging to the transport company, on the basis of the identification data stored in the data storage unit 32. In cases where the data distribution unit 33 determines that the transmitted abnormal data has been output from a vehicle 1 belonging to the transport company, the data distribution unit 33 distributes that abnormal data to the transport company.

As a result, a manager of the transport company can know that abnormalities have occurred in the tires 3 of the vehicle 1 traveling on the road 200. Then, the manager can, for example, order the vehicle 1 with the abnormal tires 3 to return, perform maintenance on the tires 3 of that vehicle 1, assign a vehicle 1 with normal tires 3, or the like. As a result, collisions or accidents involving the vehicle 1 can be prevented.

Additionally, the management device 7 collects the state quantity data of the tires 3 of each of the plurality of vehicles 1 belonging to the transport company, to which the command device 400 issues dispatch orders. The management device 7 analyzes the collected state quantity data and generates analysis data. For example, in a case where 100 vehicles 1 belong to the transport company, the management device 7 collects the state quantity data of the tires 3 of each of these 100 vehicles 1 and generates analysis data. For example, the management device 7 calculates a proportion of abnormal data in the acquired state quantity data of the tires 3 of the 100 vehicles 1. The management device 7 transmits the analysis data indicating the proportion that the abnormal data accounts for to the command device 400.

Figure 15:
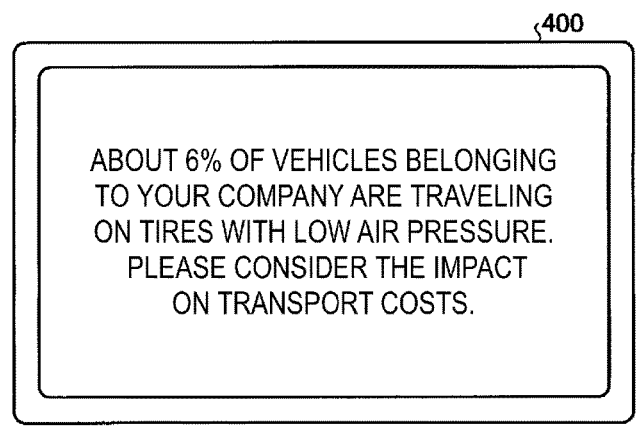
FIG. 15 is a drawing schematically illustrating an example of a collision avoidance method according to the fourth embodiment.

FIG. 15 is a drawing schematically illustrating an example of the analysis data transmitted to the command device 400. The command device 400 generates display data to be displayed on a display device provided in the command device 400, on the basis of the analysis data transmitted from the management device 7. As illustrated in FIG. 15, the display device of the command device 400 outputs the display data representing the analysis data on the collected state quantity data on the basis of the analysis data.

Rolling resistance increases and leads to energy loss when traveling using tires 3 with low air pressure. As a result, the fuel economy of the vehicle 1 worsens, which leads to increased transport costs. Due to the fact that the state quantity data of the tires 3 of the plurality of vehicles 1 belonging to the transport company is acquired and analyzed using infrastructure equipment, messages promoting interest in the transport costs can be distributed.

Fifth Embodiment

A fifth embodiment will now be described. In the following description, constituents identical or equivalent to those in the above-described embodiments have the same reference signs, and descriptions thereof will be simplified or omitted.

Figure 16:
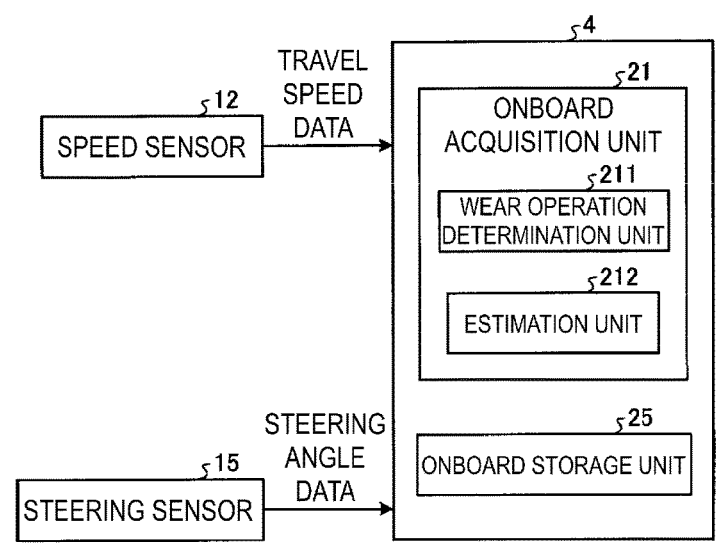
FIG. 16 is a function block diagram illustrating an example of an onboard acquisition unit according to a fifth embodiment.

In the present embodiment, a description is given of an example of a method for acquiring amount of wear data. FIG. 16 is a function block diagram illustrating an example of the onboard acquisition unit 21 of the control device 4 according to the present embodiment. Note that in FIG. 16, depiction of the onboard transmission unit 22, the onboard receiving unit 23, the abnormality determination unit 24, the warning control unit 26, and the like is omitted. In the present embodiment, the amount of wear data of the tires 3 is requested using travel speed data indicating the travel speed of the vehicle 1 and steering angle data indicating the steering angle of the steering apparatus 10. As illustrated in FIG. 16, the onboard acquisition unit 21 includes a wear operation determination unit 211 that determines whether or not a wear operation whereby the tires 3 are worn has been performed, and an estimation unit 212 that estimates the amount of wear of the tires on the basis of history data of the wear operation.

The wear operation includes at least one of a rapid deceleration operation where the vehicle 1 decelerates at a first predetermined speed per unit time or faster, a cornering operation where the vehicle 1 travels on a curve having a curvature radius less than or equal to a predetermined value at a second predetermined speed or faster, and a static steering operation where the orientation of the tires 3 is changed while the vehicle 1 is in a stopped state.

The tires 3 are damaged when rapid deceleration operations are performed, which leads to increases in the amount of wear of the tires 3. The rate of deceleration (negative acceleration) of the vehicle 1 can be found from the travel speed data of the speed sensor 12. Relationships (table data) between rates of deceleration of the vehicle 1 and amounts of wear of the tread portion of the tires 3 corresponding to each rate of deceleration are stored in the onboard storage unit 25. This table data can be acquired by conducting experiments beforehand, or can be acquired by conducting simulations that take the material characteristics of the tread portion of the tires 3 into consideration.

The wear operation determination unit 211 determines whether or not a rapid deceleration operation has been performed on the basis of the travel speed data acquired from the speed sensor 12. In cases where it is determined that a rapid deceleration operation has been performed, the estimation unit 212 estimates the amount of wear of the tread portion of the tires 3 on the basis of the rate of deceleration derived from the travel speed data and the table data stored in the onboard storage unit 25.

Additionally, the tires 3 are damaged when cornering operations are performed where the vehicle 1 turns on tight curves of the road 200 at high speeds, which leads to increases in the amount of wear of the tires 3. The travel speed of the vehicle 1 can be found from the travel speed data of the speed sensor 12. The curvature radius of the curve can be found from the steering angle data of the steering sensor 15. Relationships (table data) between travel speeds of the vehicle 1, curvature radii of curves (steering angles of the steering apparatus 10), and amounts of wear of the tread portion are stored in the onboard storage unit 25. This table data can be acquired by conducting experiments beforehand, or can be acquired by conducting simulations that take the material characteristics of the tread portion of the tires 3 into consideration.

The wear operation determination unit 211 can determine whether or not a cornering operation has been performed on the basis of the travel speed data acquired from the speed sensor 12 and the steering angle data acquired from the steering sensor 15. In cases where it is determined that a cornering operation has been performed, the estimation unit 212 estimates the amount of wear of the tread portion of the tires 3 on the basis of the travel speed of the vehicle 1 derived from the travel speed data, the steering angle data acquired from the steering sensor 15, and the table data stored in the onboard storage unit 25.

Additionally, the tires 3 are damaged when a static steering operation is performed where the orientation of the tires 3 is changed while the vehicle 1 is in a stopped state, which damages the tires 3 and leads to increases in the amount of wear of the tires 3. Whether or not the vehicle 1 is in a stopped state can be determined from the travel speed data of the speed sensor 12. Whether or not the orientation of the tires 3 has been changed can be determined from the steering angle data of the steering sensor 15. The amount of wear of the tires 3 caused by the static steering operation varies depending on the weight (load acting on the tires 3) of the vehicle 1. Relationships (table data) between weights of the vehicles 1 and amounts of wear of the tread portion of the tires 3 corresponding to respective weights are stored in the onboard storage unit 25. This table data can be acquired by conducting experiments beforehand, or can be acquired by conducting simulations that take the material characteristics of the tread portion of the tires 3 into consideration.

The wear operation determination unit 211 can determine whether or not a static steering operation has been performed on the basis of the travel speed data acquired from the speed sensor 12 and the steering angle data acquired from the steering sensor 15. In cases where it is determined that a static steering operation has been performed, the estimation unit 212 estimates the amount of wear of the tread portion of the tires 3 on the basis of the travel speed of the vehicle 1 derived from the travel speed data, the steering angle data acquired from the steering sensor 15, and the table data stored in the onboard storage unit 25.

Sixth Embodiment

A sixth embodiment will now be described. In the following description, constituents identical or equivalent to those in the above-described embodiments have the same reference signs, and descriptions thereof will be simplified or omitted.

In the present embodiment as well, a description is given of an example of a method for acquiring the amount of wear data. In the embodiments described above, examples are given in which the amount of wear of the tires 3 of the host vehicle 1M is estimated by the host vehicle 1M. Alternatively, the following vehicle 1F may estimate the amount of wear of the tires 3 of the host vehicle 1M.

Figure 17:
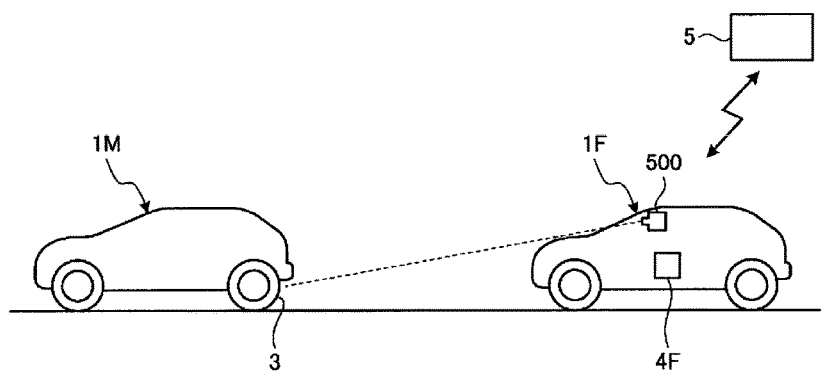
FIG. 17 is a drawing schematically illustrating a relationship between a host vehicle and a following vehicle according to a sixth embodiment.

FIG. 17 is a drawing schematically illustrating a relationship between the host vehicle 1M and the following vehicle 1F traveling behind the host vehicle 1M, according to the present embodiment. As illustrated in FIG. 17, in the present embodiment, a camera 500 is mounted on the following vehicle 1F. The camera 500 acquires images of the tires 3 of the host vehicle 1M traveling in front of the following vehicle 1F. Images of the tires 3 of the host vehicle 1M are acquired by the camera 500. Image data representing the images acquired by the camera 500 is output to the control device 4 of the following vehicle 1F.

Figure 18:
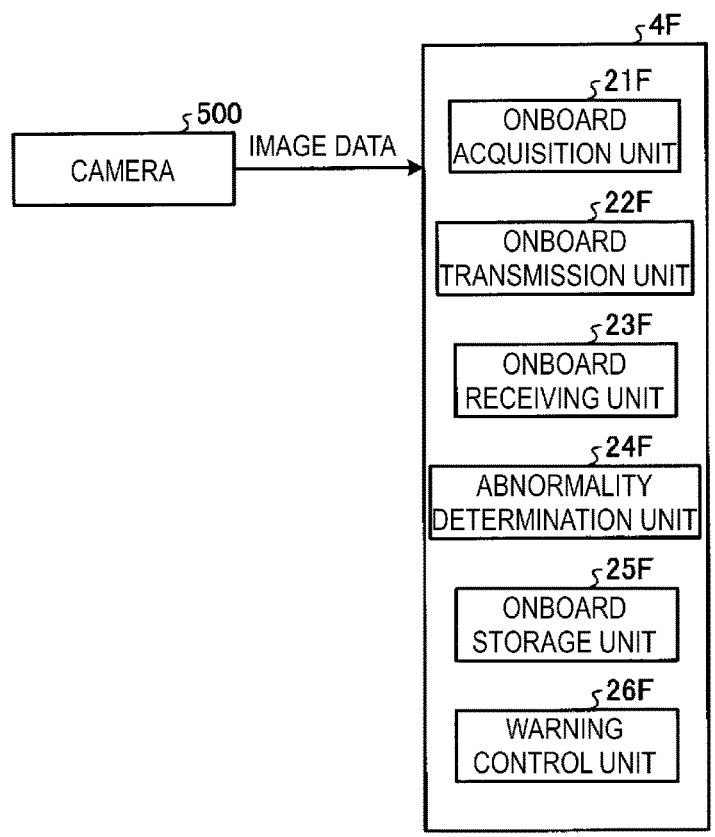
FIG. 18 is a function block diagram illustrating an example of a control device of the following vehicle according to the sixth embodiment.

FIG. 18 is a function block diagram illustrating an example of a control device 4F of the following vehicle 1F according to the present embodiment. The control device 4F includes a following vehicle acquisition unit, namely an onboard acquisition unit 21F, that is provided in the following vehicle 1F and that acquires amount of wear data indicating the amount of wear of the tires 3 of the host vehicle 1M; a following vehicle transmission unit, namely an onboard transmission unit 22F, that is provided in the following vehicle 1F and that transmits the amount of wear data acquired by the onboard acquisition unit 21F to the data acquisition unit 5A of the roadside device 5; an onboard receiving unit 23F that receives data from the data transmission unit 5B of the roadside device 5; an abnormality determination unit 24F that determines whether or not the amount of wear data of the tires 3 of the host vehicle 1M is abnormal; an onboard storage unit 25F that stores reference value data representing criteria to be used for the abnormality determination; and a warning control unit 26F that outputs warning data to the warning device 16. The functions of the control device 4F are the same as those of the control device 4 described in the embodiments above.

In the present embodiment, the onboard acquisition unit 21F performs image processing on the image data of the tires 3 of the host vehicle 1M acquired by the camera 500. As a result, groove depth of the tires 3 is found and the amount of wear of the tread portion of the tires 3 is estimated.

Seventh Embodiment

A seventh embodiment will now be described. In the following description, constituents identical or equivalent to those in the above-described embodiments have the same reference signs, and descriptions thereof will be simplified or omitted.

Figure 19:
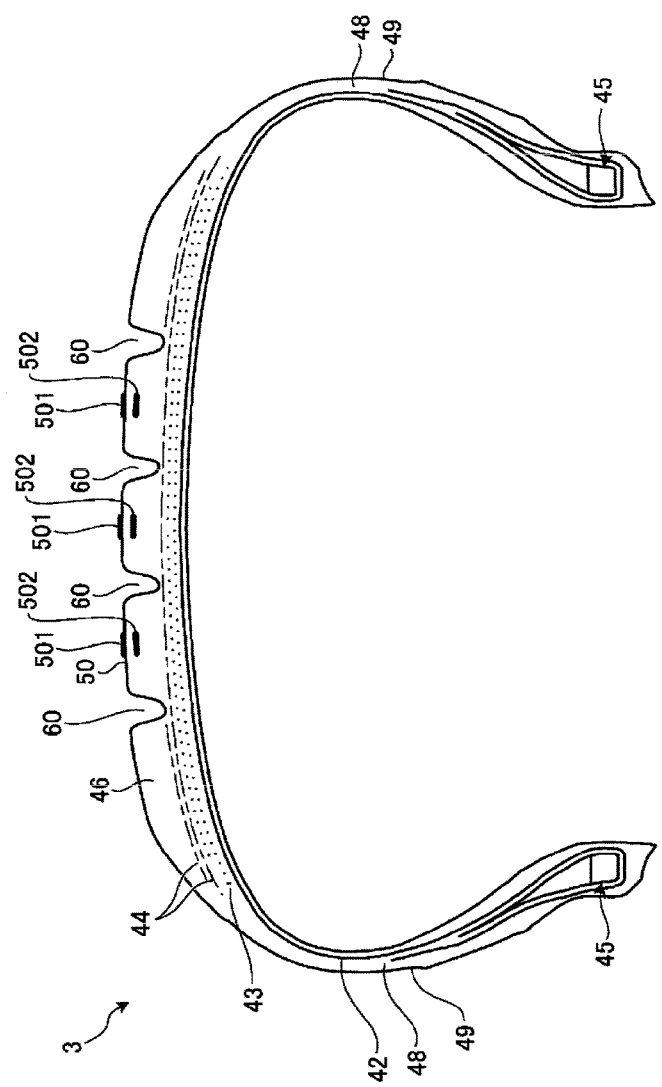
FIG. 19 is a cross-sectional view schematically illustrating an example of a pneumatic tire according to a seventh embodiment.

FIG. 19 is a cross-sectional view illustrating an example of a tire 3 of the host vehicle 1M according to the present embodiment. As illustrated in FIG. 19, the tire 3 includes a carcass portion 42, a belt layer 43, a belt cover 44, bead portions 45, a tread portion 50, and sidewall portions 49. The tread portion 50 includes tread rubber 46. The sidewall portions 49 include sidewall rubber 48. Grooves 60 such as main grooves and lug grooves are formed in the tread rubber 46.

In the present embodiment, the tire 3 includes first marks 501 provided on the surface of the tread portion 50 that comes into contact with the road surface, and second marks 502 that are embedded in the tread rubber 46 of the tread portion 50.

The image data of the tires 3 of the host vehicle 1M is acquired by the camera 500 that is mounted on the following vehicle 1F, as described while referencing FIG. 17 above. The onboard acquisition unit 21F of the following vehicle 1F can estimate the amount of wear of the tires 3 with high accuracy on the basis of the image data of the tires 3 of the host vehicle 1M acquired by the camera 500.

Figure 20:
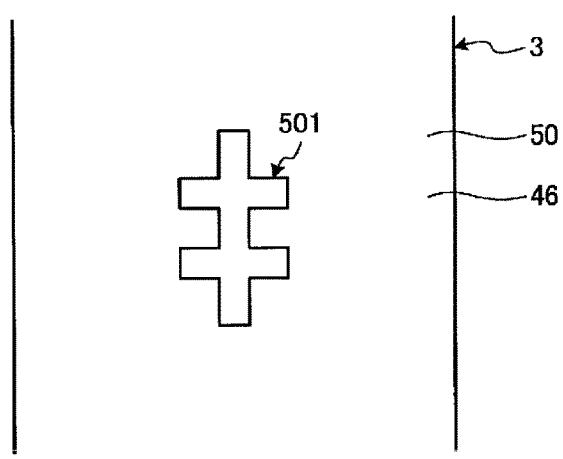
FIG. 20 is a drawing schematically illustrating an example of the pneumatic tire according to the seventh embodiment.
Figure 21:
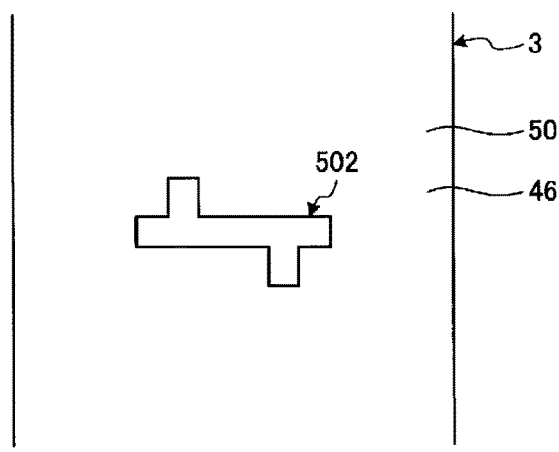
FIG. 21 is a drawing schematically illustrating an example of the pneumatic tire according to the seventh embodiment.

FIG. 20 is a schematic diagram illustrating an example of the surface of the tread portion 50 of a tire 3. FIG. 21 is a schematic diagram illustrating an example of the surface of the tread portion 50 of the tire 3. As illustrated in FIG. 20, the first marks 501 are provided on the surface of the tread portion 50. The second marks 502 are embedded in the tread rubber 46. The first marks 501 and the second marks 502 have shapes (designs) that differ from each other. The camera 500 can acquire images of the first marks 501 and the second marks 502.

When the tire 3 is new and the amount of wear is small, the first marks 501 appear and the second marks 502 do not appear on the surface of the tire 3. Accordingly, when the amount of wear of the tire 3 is small, the camera 500 acquires image data of the first marks 501.

When wear of the tire 3 progresses, the first marks 501 disappear and the second marks appear on the surface of the tire 3. Accordingly, when the amount of wear of the tire 3 has progressed, the camera 500 acquires image data of the second marks 502.

Relationships (map data) of the shape of the first marks 501 and the shape of the second marks 502 with amounts of wear of the tire 3 when the first marks 501 or the second marks 502 have appeared on the surface of the tire 3 are stored in advance in the onboard storage unit 25F of the following vehicle 1F. As such, the onboard acquisition unit 21F of the following vehicle 1F can estimate the amount of wear of the tires 3 of the host vehicle 1M on the basis of the image data representing the images acquired by the camera 500 and the map data stored in the onboard storage unit 25F.

Note that, in the present embodiment, an example has been given in which images are acquired of the first marks 501 and the second marks 502 that are provided in two different layers. It is obvious though that marks of differing designs may be provided individually in three or more different layers. As a result, the amount of wear of the tires 3 can be estimated with even higher accuracy.

The invention claimed is:

1. A collision avoidance system, comprising:
   an onboard acquisition unit provided in a vehicle traveling on a road and configured to acquire state quantity data indicating a state quantity of a pneumatic tire of the vehicle, the state quantity including an amount of wear of the pneumatic tire, the onboard acquisition unit comprising:
     a wear operation determination unit configured to determine whether or not a wear operation whereby the pneumatic tire is worn has been performed, the wear operation including at least one of a rapid deceleration operation where the vehicle decelerates at a first predetermined speed per unit time or faster, or a cornering operation where the vehicle travels on a curve having a curvature radius less than or equal to a predetermined value at a second predetermined speed or faster; and
     an estimation unit configured to estimate the amount of wear of the pneumatic tire on the basis of history data of the wear operation;
   an onboard transmission unit provided in the vehicle and configured to transmit the state quantity data acquired by the onboard acquisition unit to a data acquisition roadside device installed on the road;
   an abnormality determination unit configured to determine whether or not the state quantity data is abnormal; and
   a management device including:
     a data acquisition unit configured to acquire the state quantity data from the data acquisition roadside device;
     a data storage unit configured to store the state quantity data acquired by the data acquisition unit; and a data distribution unit configured to distribute the state quantity data determined as abnormal by the abnormality determination unit.

2. The collision avoidance system according to claim 1, wherein:
the data distribution unit is configured to distribute the state quantity data to a data transmission roadside device installed on the road; and
the state quantity data is transmitted via the data transmission roadside device to at least one of a preceding vehicle traveling in front of the vehicle and a following vehicle traveling behind the vehicle.

3. The collision avoidance system according to claim 2, wherein:
the management device is configured to:
collect the state quantity data of the pneumatic tires of each of a plurality of vehicles that has passed a predetermined location of the road; and
among the plurality of vehicles, when an abnormal vehicle for which the state quantity data has been determined as abnormal passes the predetermined location again, transmit, to the abnormal vehicle, request data requesting improvement of the pneumatic tire.

4. The collision avoidance system according to claim 3, wherein:
the management device is configured to transmit analysis data on the state quantity data collected in a predetermined period to the abnormal vehicle.

5. The collision avoidance system according to claim 4, wherein:
the vehicle travels in accordance with a dispatch order; and
the data distribution unit is configured to distribute the state quantity data to a command device configured to issue the dispatch order.

6. The collision avoidance system according to claim 5, wherein:
the management device is configured to:
collect the state quantity data of the pneumatic tires of each of a plurality of vehicles to which dispatch orders are issued by the command device; and
distribute the analysis data on the state quantity data that has been collected to the command device.

7. The collision avoidance system according to claim 6, wherein the state quantity includes an amount of wear of the pneumatic tire,
the collision avoidance system further comprising:
a following vehicle acquisition unit provided in the following vehicle traveling behind the vehicle and configured to acquire amount of wear data indicating the amount of wear of the pneumatic tire of the vehicle; and
a following vehicle transmission unit provided in the following vehicle and configured to transmit the amount of wear data acquired by the following vehicle acquisition unit to the data acquisition roadside device;
wherein
the abnormality determination unit is configured to determine whether or not the amount of wear data is abnormal, and
the data distribution unit is configured to distribute the amount of wear data determined as abnormal by the abnormality determination unit to at least one of the vehicle and a second following vehicle traveling behind the following vehicle.

8. The collision avoidance system according to claim 7, wherein:

the pneumatic tire includes a first mark provided on a surface of a tread portion that comes into contact with a road surface, and a second mark embedded in tread rubber of the tread portion; and
the following vehicle acquisition unit includes a camera configured to acquire images of the first mark and the second mark, and is configured to estimate the amount of wear of the pneumatic tire on the basis of image data representing the acquired images.

9. The collision avoidance system according to claim 1, wherein:
the management device is configured to:
collect the state quantity data of the pneumatic tires of each of a plurality of vehicles that has passed a predetermined location of the road; and
among the plurality of vehicles, when an abnormal vehicle for which the state quantity data has been determined as abnormal passes the predetermined location again, transmit, to the abnormal vehicle, request data requesting improvement of the pneumatic tire.

10. The collision avoidance system according to claim 9, wherein:
the management device is configured to transmit analysis data on the state quantity data collected in a predetermined period to the abnormal vehicle.

11. The collision avoidance system according to claim 1, wherein:
the vehicle travels in accordance with a dispatch order; and
the data distribution unit is configured to distribute the state quantity data to a command device configured to issue the dispatch order.

12. The collision avoidance system according to claim 11, wherein:
the management device is configured to:
collect the state quantity data of the pneumatic tires of each of a plurality of vehicles to which dispatch orders are issued by the command device; and
distribute analysis data on the state quantity data that has been collected to the command device.

13. The collision avoidance system according to claim 1,
the state quantity including an amount of wear of the pneumatic tire,
the collision avoidance system comprising:
a following vehicle acquisition unit provided in the following vehicle traveling behind the vehicle and configured to acquire amount of wear data indicating the amount of wear of the pneumatic tire of the vehicle; and
a following vehicle transmission unit provided in the following vehicle and configured to transmit the amount of wear data acquired by the following vehicle acquisition unit to the data acquisition roadside device;
wherein
the abnormality determination unit is configured to determine whether or not the amount of wear data is abnormal, and
the data distribution unit is configured to distribute the amount of wear data determined as abnormal by the abnormality determination unit to at least one of the vehicle and a second following vehicle traveling behind the following vehicle.

14. The collision avoidance system according to claim 13, wherein:
the pneumatic tire includes a first mark provided on a surface of a tread portion that comes into contact with a road surface, and a second mark embedded in tread rubber of the tread portion; and the following vehicle acquisition unit includes a camera configured to acquire images of the first mark and the second mark, and is configured to estimate the amount of wear of the pneumatic tire on the basis of image data representing the acquired images.

15. A collision avoidance system, comprising:

an onboard acquisition unit provided in a vehicle traveling on a road and configured to acquire state quantity data indicating a state quantity of a pneumatic tire of the vehicle, the state quantity including an amount of wear of the pneumatic tire, and the pneumatic tire including: a first mark provided on a surface of a tread portion that comes into contact with a road surface, and a second mark embedded in tread rubber of the tread portion;

an onboard transmission unit provided in the vehicle and configured to transmit the state quantity data acquired by the onboard acquisition unit to a data acquisition roadside device installed on the road;

an abnormality determination unit configured to determine whether or not the amount of wear is abnormal; and a management device including:

a data acquisition unit configured to acquire the state quantity data from the data acquisition roadside device;

a data storage unit configured to store the state quantity data acquired by the data acquisition unit;

a data distribution unit configured to distribute the state quantity data determined as abnormal by the abnormality determination unit;

a following vehicle acquisition unit provided in a following vehicle traveling behind the vehicle and configured to acquire amount of wear data indicating the amount of wear of the pneumatic tire of the vehicle, the following vehicle acquisition unit including a camera configured to acquire images of the first mark and the second mark, and is configured to estimate the amount of wear of the pneumatic tire on the basis of image data representing the acquired images; and a following vehicle transmission unit provided in the following vehicle and configured to transmit the amount of wear data acquired by the following vehicle acquisition unit to the data acquisition roadside device;

wherein the data distribution unit is configured to distribute the amount of wear data determined as abnormal by the abnormality determination unit to at least one of the vehicle and a second following vehicle traveling behind the following vehicle.

\* \* \* \* \*